United States Patent [19]

Hamilton

[11] Patent Number: 4,739,954
[45] Date of Patent: Apr. 26, 1988

[54] OVER-LAP RIB JOINT

[76] Inventor: Terry W. Hamilton, Box 49, Bulverde, Tex. 78163

[21] Appl. No.: 914,998

[22] Filed: Dec. 29, 1986

[51] Int. Cl.$^4$ .............................................. B64C 3/26
[52] U.S. Cl. .................................... 244/123; 244/124; 244/131; 416/226
[58] Field of Search .................... 244/117 R, 119, 120, 244/123, 124, 131, 138 R; 410/226, 233, 225

[56] References Cited

U.S. PATENT DOCUMENTS

| | | | |
|---|---|---|---|
| 1,445,454 | 2/1923 | Short | 244/123 |
| 1,603,051 | 10/1926 | Hall | 244/124 |
| 2,372,981 | 4/1945 | Quilter | 244/138 R |
| 2,403,569 | 7/1946 | Watter | 244/124 |
| 2,432,396 | 12/1947 | Earhart | 244/124 |
| 2,558,819 | 7/1951 | Chausson | 244/124 |
| 2,621,001 | 12/1952 | Roman | 244/123 |
| 2,749,061 | 6/1956 | Franz | 244/123 |
| 3,775,238 | 11/1973 | Lyman | 244/123 |

FOREIGN PATENT DOCUMENTS 1080859  4/1960  Fed. Rep. of Germany ...... 244/123

Primary Examiner—Galen Barefoot
Attorney, Agent, or Firm—Gunn, Lee & Jackson

[57] ABSTRACT

A method for joining the upper surface of a wing to its lower surface during assembly of the wing, and a novel internal wing structure. The method and structure uses multiple overlapping rib pairs. A rib is attached to the upper surface of the wing and overlaps an identical rib attached to the lower surface when the two surfaces are brought together at the leading and trailing edges. The two ribs so disposed are flush, one lying next to another with a rib spar hole in each rib matching an identical hole in the other of the pair. Wing spars are then inserted into the wing spar holes. In this manner wing spar alignment and attachment is simplified, and the upper and lower surfaces of the wings are mated.

12 Claims, 2 Drawing Sheets

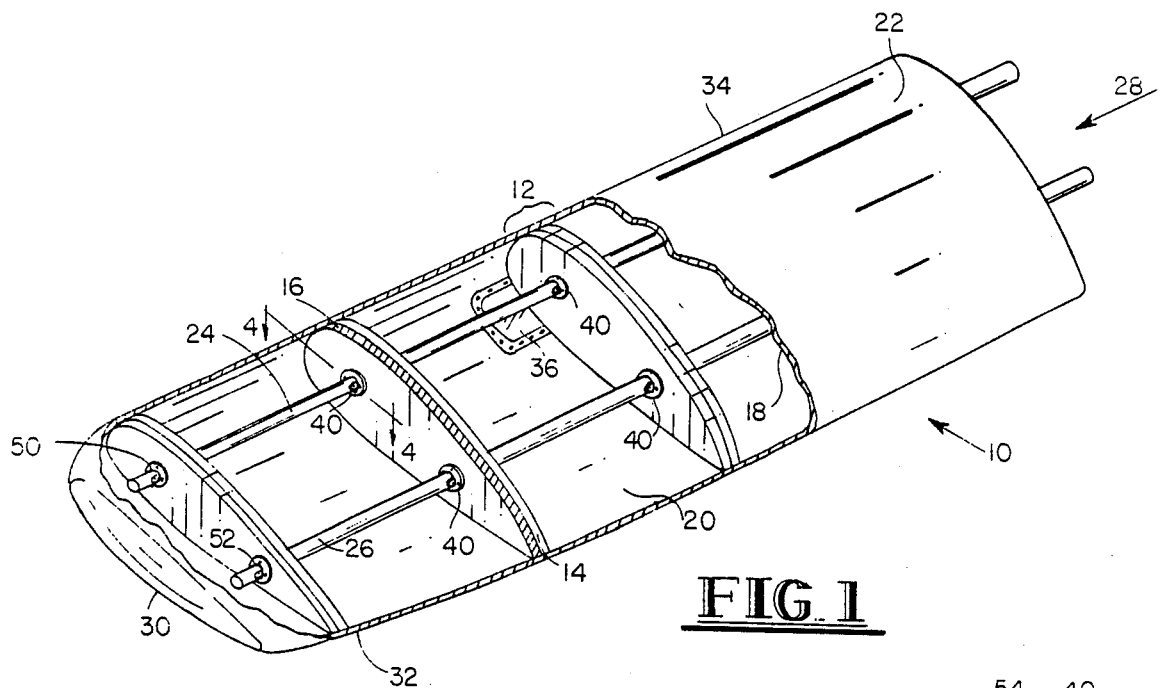
FIG. 1
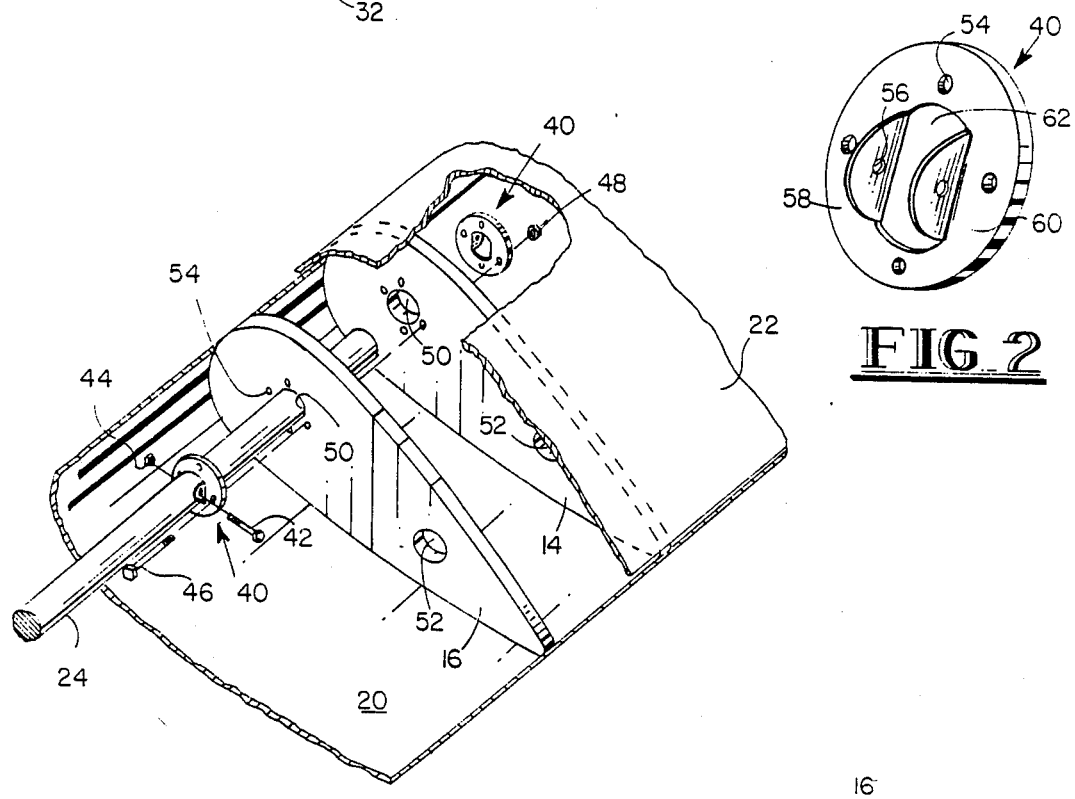
FIG. 2
FIG. 3
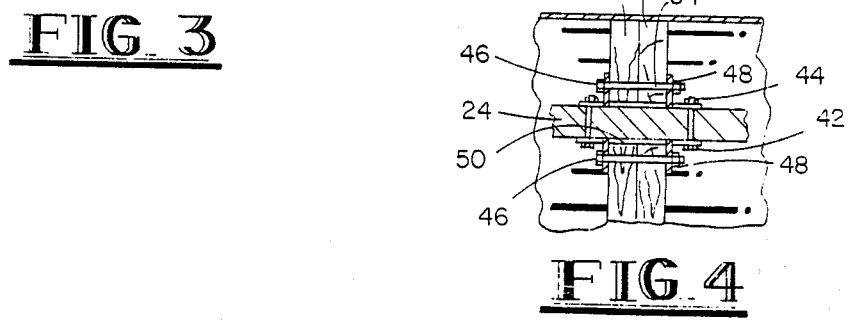
FIG. 4

OVER-LAP RIB JOINT

BACKGROUND OF THE INVENTION

This invention relates to the structure and assembly of an aircraft's wing. More particularly, to an aircraft wing in which ribs attached to the upper surface of the wing and ribs attached to the lower surface overlap with the surfaces being held together when the wing spar is passed through holes in the ribs.

FIELD OF THE INVENTION

The field of this invention generally is aircraft; particularly, wing structures for same.

BRIEF DESCRIPTION OF THE PRIOR ART

The building of lightweight aircraft by amateurs, which used to be unusual, has become almost commonplace. This hobby has come to notice a wider acceptance among the public. Some builders purchase plans and an engine and then fabricate from wood, fabric, foam, fiber glass or metal the parts to assemble into an airplane. However, many builders purchase the prefabricated parts and materials from a manufacturer of such kits. While the aircraft is still "homebuilt," much of the fabrication of the component parts is already done.

One of the most difficult aspects of homebuilt aircraft construction is building the wing. For example, to construct a wing, ribs must first be made. This is usually done by shaping a foam blank to a template. The ribs are then placed on a spar, usually made of wood or metal, and then the assembly is covered with fabric, fiber glass, metal or wood skin to create the completed wing. Some homebuildrs choose to construct the individual rib sections themselves. However, for the kit assembler, the manufacturer will often supply the ribs as preformed blanks. It is then up to the homebuilder to "lay up the wing," by attaching ribs to spars and covering the assembly with a skin.

There are a number of methods of constructing a wing. Below I will summarize a traditional method and two alternate methods.

It is traditional to prepare each rib in sections. A forward section of the rib is shaped to match the outline of the leading edge of the wing and to fit to the front of a main spar. A middle section of the rib will then be cut to a profile that matches the top and bottom surface of the wing section. This middle section attaches to the rear of the main spar and the front of the secondary spar, which is located further toward the trailing edge of the wing. This secondary spar is designed to bear significantly less load than the main spar. In fact, on some designs it is omitted entirely. A third rib section is then attached to the rear of the secondary spar and outlines the trailing edge of the wing.

After the rib sections are fabricated, they are carefully attached to the main and secondary spar by gluing, mechanical fastening, or a combination of the two. This rib to spar attachment is critical, both as to its strength and its location. The rib/spars assembly creates a "skeleton" on which the wing skin—be it wood, metal, fabric or fiber glass—is laid. The wing skin transfers its load (weight of aircraft) to the spars through the ribs. For proper aerodynamics and structural integrity, the rib/spar skeleton must be strong and properly aligned.

An example of the traditional method of aircraft wing construction is illustrated by the very popular, fully aerobatic "Christian Eagle," designed by Frank L Christensen in 1977 and available in kit form from Christen Industries, Afton, WY 83110. Materials used in the construction of the Christian Eagle are: sheet metal, tubing, fabric, wood, and composite. It is not designed for the beginner, and is estimated to require 2,500 man hours of skilled labor to complete. Federal Aviation Agency approved components and established aircraft quality materials are used, especially in fabricating parts constituting the primary structure, such as wing spars. An aircraft built from such a kit may be eligible for FAA certification provided the major (over fifty percent) portion has been "fabricated and assembled" by the amateur builder. In the Eagle, the major portion of the kit constitutes raw stock, such as length of wood, tubing, extrusions, etc., which may have been cut to an approximate length. It also contains a certain quantity of prefabricated parts, such as heat-treated ribs, bulkheads or complex forms made from sheet metal, fiber glass, or composites. Templates are required to insure proper shape of the flying surfaces. Ribs are contour-sawed from one quarter inch marine plywood. Main spars are spruce, as are the false and aileron spars. The wing uses a wood cross hatching in the form of an "X" between each rib and the spars, serving the drag anti-drag load-carrying duties. Plywood wing tips and wooden trailing edges complete the structure within the aluminum leading edge shim. The by-plane wings are strut braced to each other, coated with dacron wing covering, and doped.

A second method of preparing a wing utilizes a solid Kelfar foam core cut with a hot wire, shaped and then covered with fiber glass. This type of solid wing is usually used in sailplanes.

An example of the second method of preparing a wing is illustrated in the very popular "Quickie," a kit for a foam and fiber glass single or two-place canard wing aircraft sold by Quickie Aircraft Corporation of Mojave, Calif. The builder uses an electrically heated wire to cut blocks of rigid foam into wing and canard airfoil shapes utilizing templates as patterns. The foam is then bonded to carbon fiber spars, covered with layers of fiber glass and epoxy resin, cured at room temperature, and sanded to a smooth finish. The finished airfoils then are attached to fiber glass and foam fuselage shell and the detailed systems installation finishing work begin. The fiber glass skins are applied by the builder.

A third type of wing construction uses Kelfar foam sections, glued together, shaped and then fiber glassed. In this case, the wing is not solid.

An example of this third type of wing construction is the composite "Star-Lite" single seater designed by Mark Brown of San Antonio, Tex. Star-Lite's wing is based on a double tapered, premanufactured spar of aircraft certified Sitka spruce. The spar tapers from six inches deep at the root to three inches at the tip, and from a root thickness of one inch to ¼" at the tip. Wing building begins as precut, trailing edge, extruded polystyrene, blue foam ribs are glued to the spar at eight-inch intervals. A preformed fiber glass-and-foam C-shaped trailing edge spar supports the aileron, which is nearly full span. Covering is 1 mil-thick 3-ply birch plywood, which is glued to the spars and ribs. Leading edge foam ribs, also precut, are glued to the main spar, and one-mil plywood is held in place during the bonding process. Epoxy is used in the bonding throughout the Star-Lite aircraft. Foam wing ribs are precut. The wings plug into the fuselage by means of the spars.

All three of the methods described require the builder to shape the wing surface and bond the ribs, if any, to the wing skin and spars—to "lay up" the wing. This is not only one of the most difficult steps to do from both an alignment sense and a structural integrity sense—but it is one of the most critical.

The aerodynamics of a wing are a function of the nature of the airflow over the wing. In flight, flow of air over the wing surface is primarily laminar. As air speed is decreased, it is necessary to increase angle of attack to maintain altitude. This will tend to break down the laminar flow of air. If the wing skin is not smooth or the dimensions of the wing are not according to specifications, the initiation of turbulent flow of air across the wing can occur suddenly and at speeds that are too great. This precipitates a "stall" and the aircraft will plummet.

The alignment of the wing is also critical. For example, "washout" or "twist" is built into a wing so the wing meets the air at higher angle of attack at the wing root than it does at the wing tip. This allows the wing to stall first at the root rather than at the wing tip. If the washout is not matched perfectly on both sides, the plane may drop off to one side of another during stall and precipitate a spin. Or a plane without proper washout may stall at too high a speed. A single degree of washout can be critical to proper aerodynamics.

The structural integrity of the wing depends on the strength and location of the wing skin/rib bond and the rib/spar bond. If these are not assembled properly, premature fatigue and separation may result.

For example, many homebuilders utilize "composite" construction for their aircraft. Such popular aircraft as the Quickie, Polliwagon, Vari-eze and the Dragonfly utilize the Foam/Fiberglass kits. However, while the result is a light, strong, flexible aircraft, the skill required to work with such materials is significant. Resin is messy to work with and is both time and temperature sensitive. Glass must be laid "clean" and resin applied without overlap, bubbles or waves.

Because of the often limited experience, limited resources and facilities of the homebuilder, combined with the critical nature of wing construction, the wing construction step is usually the most discouraging for the homebuilder. The kits presently offered do not solve the many problems set out above that perplex the often befuddled builder at this juncture in his project. What is needed is a new structure and method of assembling a wing that will simplify or eliminate the aerodynamic/structural integrity problems, heretofore unsolved, facing the kit assembler.

This invention also relates to the assembly of model airplanes, in particular those that are powered by small engines and flown by radio control. Presently kits offer preformed ribs, usually of foam or balsa wood, whose final shape is prepared by the home builder. Spars are used in much the same way as the full sized kit aircraft. Wing skin, however, is often lightweight paper that is then treated with a liquid finisher or painted. The shaping, gluing, and finishing required in these scale model planes are very time-consuming, and the hobbyist is often left with mediocre results. The same difficulties that the full-sized aircraft builder faces must be countenanced by the scale model builder, albeit on a small scale and with potentially less severe consequences.

SUMMARY OF THE INVENTION

It is the object of this invention to provide a simple and efficient method by which a homebuilder may assemble an aircraft wing.

It is the further object of this invention to provide an aircraft wing that may be supplied to a homebuilder with wing surfaces already attached to ribs.

It is a further object of this invention to provide for a wing that may be assembled by a homebuilder which wing has the aerodynamic surfaces already shaped and attached to the ribs, which surfaces may be joined with a spar passing through the ribs.

It is a further object of this invention to provide a means of securing the spars to the ribs and the ribs to each other.

BRIEF DESCRIPTION OF THE DRAWINGS

FIG. 1 is a cutaway view of the wing illustrating the internal structure.

FIG. 2 is an illustration of the collar.

FIG. 3 is an exploded view of the internal structure of the overlap ribs, the spar and the collar.

FIG. 4 is a cross-section of the wing through section 4 of FIG. 1 showing the overlap rib joint as secured by the spar collar.

BRIEF DESCRIPTION OF THE PREFERRED EMBODIMENT

Figure 1A:
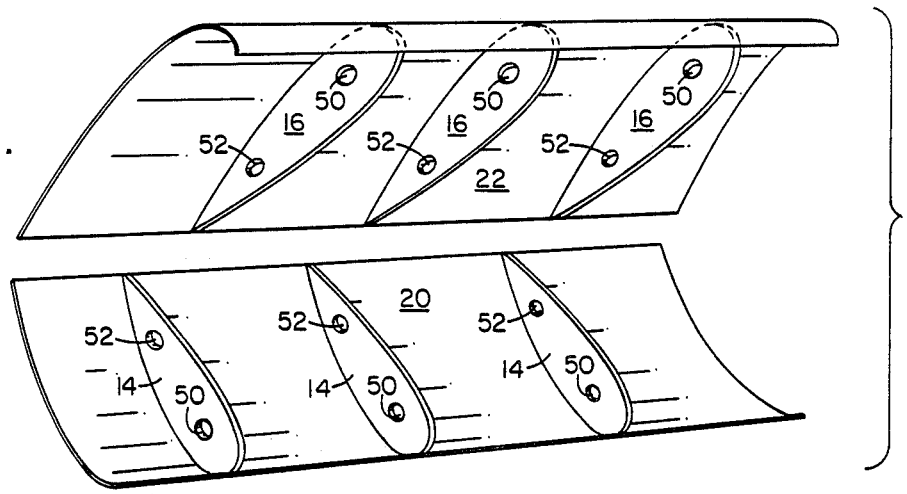
FIG. 1a is an exploded perspective illustrating the paired nature of the wing halves and the overlapping ribs.
Figure 1B:
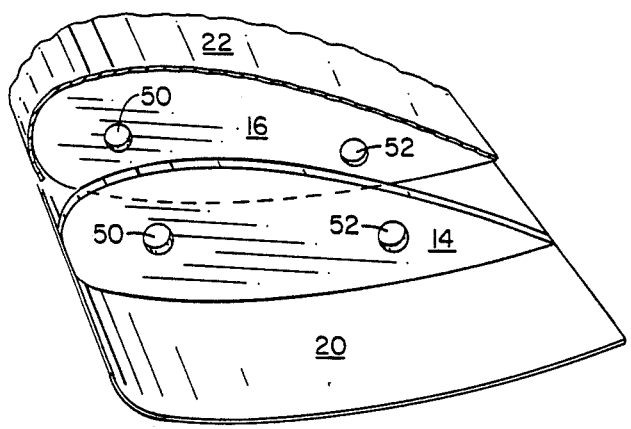
FIG. 1b is an exploded side view illustrating the nature of the overlap of the ribs.

FIGS. 1, 1a and 1b illustrate internal structure of wing 10. Spars 24 and 26 are connected to ribs 14 and 16 by collar 40. Rib 14 bonded to upper surface 22 of wing 10 overlaps rib 16 which is bonded to lower surface 20 of wing 10. When upper surface 22 and lower surface 20 are brought together, ribs 14 and 16 overlap to form overlap rib joint 12 and spar holes 50 and 52 line up to allow passage of spars 24 and 26 therethrough. When main spar 24 and secondary spar 26 are passed through holes 50 and 52 in ribs 14 and 16 the overlap rib joint 12 is held in place by the tight fit of spars 24 and 26 in their respective spar holes 50 and 52. The joint is further secured by the attachment of collars 40 which secure the overlap rib joint 12 in a manner more fully set out below. Leading edge 34 and trailing edge 32 need to be sealed after collar 40 has secured rib joint 12. This is may be done by utilizing the same material that compromises the wing skin 18. This step is performed by the assembler of the aircraft. The manufacturer has preformed the upper surface 22, bonded to rib 14 and the lower surface 20 bonded to rib 16. Factory smooth finish of skin 18 to the proper aerodynamic dimensions and with the required structural integrity is therefore insured by expert construction. Only bonding at leading edge 34 and trailing edge 32 is required by the assembler.

Main spar 24 and secondary spar 26 are shown in the preferred embodiment to be tapered from a thicker cross-section at wing root 28 to a narrower cross section at wing tip 30. This allows for flexibility and load distribution due to the increased load carried at wing root 28. In addition, it can be seen in FIG. 1 that spars 24 and 26 are rectangular in cross-section. In alternate embodiments, the cross-sectional shape of spars 24 and 26 may be circular. Spars may be constructed of any suitable strong, light material. Sitka spruce, aluminum, or carbon fiber material are often used. Ribs 14 and 16 may be solid as illustrated in FIG. 1, and constructed of foam, or in an alternate embodiment could be an open strut braced framework with a rib cap along the joint with wing skin 18.

Collar 40 in the preferred embodiment is constructed of aircraft quality plate aluminum. In the preferred embodiment, collar 40 along the inside perimeter contacts spars 24 and 26 directly. Moreover, two collars 40 are illustrated for a single overlap rib joint 12. This is preferred though not required, as a single collar 40 may be sufficient for some purposes. In an alternate embodiment a bushing made of suitable material is inserted along the inner perimeter of collar 40 to cushion contact with spars 24 and 26. This bushing would be inspected and replaced periodically.

Neither ailerons or flaps are illustrated in any of the figures. However, it can be seen that the overlap rib joint 12 method and apparatus can be utilized on a smaller scale to create ailerons, flaps, rudders or elevators.

FIG. 1 also illustrates access panel 36 cut into lower surface of wing 20 in an area that will allow access to collar 40 of overlap rib joint 12. Access panel 36, which is useful in the construction of wing 10, also allows periodic inspection of collar 40 and overlap rib joint 12. For means of convenience and simplicity, access panel 36 is illustrated for only one overlap rib joint 12 of the three illustrated in FIG. 1. It is understood that each such rib joint 12 may have an access panel 36. As described above, access panel 36 may be helpful in securing collars 40 to ribs 14 and 16 and to spars 24 and 26. However, in the preferred embodiment there is a small gap (not shown) between upper surface 22 and lower surface 20 when they are placed together, such gap being along leading edge 34 and trailing edge 32. This gap is covered with wing skin during the bonding of upper surface 22 and lower surface 20 at leading edge 34 and trailing edge 32.

Wing skin 18 may be made of any suitably strong, flexible and lightweight substance. Fiber glass, fabric, aluminum, wood or a combination of those materials are commonly used wing skin 18 materials.

FIG. 2 illustrates collar 40. Collar 40 is made up a flat section 60 surrounding spar hole 62. Projecting generally perpendicular from flat section 60 are ears 58. Flat section 60 has collar/rib bolt holes 54 drilled therein, and ears 58 have collar/spar bolt holes 56 drilled therein. Collar 40 has spar hole 62 to allow spars 24 and 26 to pass therethrough. The dimensions of spar hole 62 are sized to comfortably hold either spar 24 or 26 at a given rib joint 12. That is, because spars 24 and 26 are tapered from wing root 28 to wing tip 30, collar 40 must be sized to fit a particular overlap rib joint 12, being larger for those rib joints 12 closer to wing root 28 than those further outward.

FIG. 3 shows how collar 40 is attached to rib joint 12. When upper surface 22 of wing 10 is matched with lower surface 20 of wing 10, ribs 14 and 16 overlap so that holes 50 and 52 match. When spars 24 and 26 are inserted through their respective holes 50 and 52, collars 40 are slid over spars 24 and 26. Each rib joint 12 is sandwiched by a pair of collars 40. Holding collar 40 flush against rib joint 12 allows assembler to utilize collar/rib bolt holes 54 in collar 40 to drill collar/rib bolt holes 54 through rib joint 12. Collar/rib bolt 46 is then passed through holes 54, and secured by collar/rib nut 48. The preferred embodiment illustrates four such collar/rib bolts 46 securing collars 40 to rib joint 12. Tightening collars 40 secures individual ribs 14 and 16 into a strong overlap rib joint 12. In this manner, upper surface 22 of wing 10 is brought together and secured to lower surface 20 of wing 10.

After rib joint 12 is secured by collars 40 and collar/rib bolt 46, assembler then drills collar/spar bolt hole 56 through spars 24 and 26. Collar/spar bolt 42 is then passed therethrough and secured by collar/spar nut 44. This secures rib joint 12 to spars 24 and 26.

While the preferred embodiment illustrates spar holes 50 and 52 as being precut in ribs 14 and 16 before the upper surface 22 and lower surface 20 of wing 10 are brought together, an alternate embodiment would allow the assembler to drill out spar holes 50 and 52 after the surfaces 20 and 22 are brought together.

FIG. 4 further illustrates the manner in which collars 40 unify upper surface 22 of wing 10 and lower surface 20 of wing 10 by securing ribs 14, 16 to each other as rib joint 12, and to spars 24 and 26. In particular, it can be seen that ears 58 through collar/spar bolts 42 secure spars 24 and 26. Flat section 60 of collar 40 secures ribs 14 and 16 through collar/rib bolts 46.

In the preferred embodiment, ribs 14 and 16 lay flush, against one another, in a parallel arrangement with planar surfaces touching. Collar 40 and fastener means are used to secure overlap rib joint 12 so formed. However, in an alternate embodiment ribs 14 and 16 need not be close together or touching. In this alternate embodiment the benefits claimed for the preferred embodiment are still present. Collars 40 and fastener means are used with each individual rib 14 and 16.

In the manner described, assembler can take an upper surface 22 and lower surface 20 which have been preformed with ribs 14, 16 attached, and whose wing skin 18 has been finished, and attach them in a manner which is strong, and requires only bonding at non-critical leading edge 34 and trailing edge 32 areas. That is, the aerodynamic dimensions of the wing 10 and the structural integrity and finish of wing skin 18 are crafted by experts at the manufacturing plant, not the kit assembler. In this manner, aircraft builder becomes more of an "assembler", with the factory performing the functions which require the greatest skill and care.

It is anticipated that the described and claimed invention can be applied to the manufacture of scale model airplanes as well as full-sized airplanes. That is, the difficulties encountered by the assembler of full-sized kits mirror in part those hobbyists who assemble and fly scale model airplanes.

Although the invention has been described with reference to a specific embodiment, this description is not meant to be construed in a limiting sense. Various modifications of the disclosed embodiments will become apparent to those skilled in the art upon reference to the description of the invention. It is, therefore, contemplated that the appended claims will cover such modifications that fall within the true scope and spirit of the invention.

I claim:

1. An airplane wing comprising:
   a plurality of rib pairs, each of said pairs having a first rib and a second rib generally planar and shaped to substantially conform to the wing's cross-section, with a first main spar hole precut through said first rib and a second main spar hole precut through said second rib, said first rib fixedly attached to an upper surface of said wing, said second rib fixedly attached to a lower surface of said wing, wherein said first and said second ribs overlap such that a plane surface of said first rib is in generally parallel relation to a plane surface of said second rib; and a main spar sized to fit tightly within both the first main spar hole of said first rib and the second main spar hole in said second rib when said upper surface is aligned with said lower surface to form said airplane wing and join said upper surface and said lower surface thereby.

2. The wing as described in claim 1 above wherein said first rib and said second rib overlap such that a plane surface of said first rib contacts in a flush, parallel relation, a plane surface of said second rib.

3. The wing described in claim 2 further comprising a collar means for securing said first rib to said second rib and said rib pair to said main spar.

4. The wing described in claim 3 above, said collar means comprising a body with a generally planar portion and an ear portion, said planar portion surrounding a spar collar hole sized to receive said main spar and containing a hole therethrough for receiving a rib bolt therethrough, said ear portion projecting generally perpendicular from said planar portion, said ear portion containing a spar bolt hole therethrough, wherein said collar means receives said main spar therethrough and secures said body, said first rib and said second rib with said rib bolt through a rotatably mounted rib bolt nut and secures said collar to said main spar with said spar bolt received through said ear poriton of said collar means, and threadably affixed thereto with a spar bolt nut thereon.

5. The wing as described in claim 1 above wherein each of said ribs includes a secondary spar hole cut therethrough at a location closer to a trailing edge of said wing wherein said secondary spar holes are aligned when said upper and lower surfaces of said wing are mated; and further comprising a secondary spar for securing said upper surface of said wing to said lower surface when said secondary spar holes are aligned.

6. The wing as described in claim 5 above wherein said main and said secondary spars each have a first end and a second end, said first end being larger in a cross-sectional area and located at a wing root, and said second end being smaller in a cross-sectional area and located at a wing tip.

7. The wing as described in claim 6 above wherein said cross-sectional area is generally circular in shape, with said main spar holes and said secondary spar holes being similarly circular in shape to receive said main spar and said secondary spar therethrough.

8. The wing as described in claim 6 above wherein said cross-sectional area is generally rectangular in shape, with said main spar holes and said secondary spar holes being similarly rectangular in shape to receive said main spar and said secondary spar therethrough.

9. A method for constructing a wing for an airplane comprising:

providing first and second ribs generally planar and shaped to substantially conform to the wing's cross-section, with a first main spar hole precut through said first rib and a second main spar hole precut through said second rib;

attaching said first rib to a lower wing surface;

attaching said second rib to an upper wing surface;

overlaying said wing surfaces, mating said first and said second ribs thereby;

passing a spar through said precut holes in said first and said second ribs, uniting said upper and said lower wing surfaces thereby; and bonding a leading and a trailing edge of said wing.

10. The method for constructing a wing for an airplane as described in claim 9, said passing step further comprising bracing said first and said second ribs with a collar means by passing said spar first through said collar means, then through said first and said second ribs, and securing said first and said second ribs to said collar means.

11. The method for constructing a wing for an airplane as described in claim 10 further comprising the step of fastening said collar means to said spar.

12. An internal structure for an airplane wing comprising:

a plurality of rib pairs, each of said pairs having a generally planar first rib in the shape of the wing cross-section with a precut first main spar hole and precut first secondary spar hole therein, said first rib fixedly attached to an upper surface of said wing, and a generally planar second rib in the shape of the wing cross-section with a precut second main spar hole and a precut second secondary spar hole therein, said second rib fixedly attached to a lower surface of said wing, wherein said first and said second rib overlap in a generally parallel relation and said spar holes generally align in a manner to allow a main spar and a secondary spar to pass therethrough when said lower surface and said upper surface brought together and joined to form said airplane wing;

said main spar of generally circular cross-sectional area tapered at a first end and broader at a second end, wherein said main spar fits tightly within said main spar holes joining said upper and said lower surfaces of said wing thereby, said first end of said main spar terminating at a tip of said wing, said second end of said main spar terminating at a root of said wing, with a longitudinal axis of said main spar aligned generally perpendicular to a plane of said ribs;

said secondary spar having a generally circular cross-sectional area which is smaller than said cross-sectional area of said main spar, said secondary spar fitting tightly within said secondary spar holes of said ribs and joining said upper surface and said lower surface of said wing thereby, wherein a longitudinal axis of said secondary spar is generally perpendicular to a plane of said ribs, and lies closer to a trailing edge than said main spar, being generally parallel thereto;

spar collars comprising a planar portion and an ear portion, said planar portion with a collar/spar hole therein sized to accept said spars, and a rib/collar bolt hole therein sized to accept a rib/collar bolt therethrough, said ear portion adjacent to said collar/spar hole and having a spar/collar bolt hole therein, sized to accept a spar/collar bolt therethrough;

said rib/collar bolt for passing through said rib pairs and said spar collar and securing them thereby when said spar holes are aligned and said spars are inserted therethrough; and said spar/collar bolts for passing through said spars, thereby fixedly attaching said collars to said spars.

* * * * *